(12) United States Patent
Afser et al.

(10) Patent No.: US 11,593,061 B2
(45) Date of Patent: Feb. 28, 2023

(54) INTERNET OF THINGS ENABLE OPERATED AERIAL VEHICLE TO OPERATED SOUND INTENSITY DETECTOR

(71) Applicant: INTERNATIONAL BUSINESS MACHINES CORPORATION, Armonk, NY (US)

(72) Inventors: Syed Shahid Ali Afser, Hyderabad (IN); Namit Kabra, Hyderabad (IN); Smitkumar Narotambhai Marvaniya, Bangalore (IN); Prashant Sharma, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 17/206,168

(22) Filed: Mar. 19, 2021

(65) Prior Publication Data

US 2022/0300245 A1 Sep. 22, 2022

(51) Int. Cl.
*G06F 3/16* (2006.01)
*G10L 25/60* (2013.01)
(Continued)

(52) U.S. Cl.
CPC ............ *G06F 3/165* (2013.01); *B64D 47/00* (2013.01); *G05D 1/104* (2013.01); *G06V 20/10* (2022.01);
(Continued)

(58) Field of Classification Search
CPC .................................. G06F 3/165; G06F 3/16
See application file for complete search history.

(56) References Cited

U.S. PATENT DOCUMENTS 7,142,677 B2 11/2006 Gonopolskiy
7,812,890 B2 10/2010 Chiu
(Continued)

FOREIGN PATENT DOCUMENTS

CN 101052242 B 11/2011
EP 2541359 B1 8/2017
KR 20150041974 A 4/2015

OTHER PUBLICATIONS

Lyles, "10 Easy Tips for Professional Audio Quality," copyblogger.com, Jul. 5, 2017 [accessed on Feb. 8, 2021], 18 pages, Retrieved from the Internet: <URL: https://copyblogger.com/professional-audio/>.

(Continued)

*Primary Examiner* — Olisa Anwah
(74) *Attorney, Agent, or Firm* — Samuel A. Waldbaum

(57) ABSTRACT

A method, the method comprising retrieving a sound intensity map for a venue, wherein the sound intensity map is divided up into a plurality of regions, wherein the sound intensity map predicts a sound quality for each region during a current event. Receiving data from a plurality of IOT enabled operated aerial vehicles, where each IOT enabled operated aerial vehicle of the plurality of IOT enabled operated aerial vehicles travels around different regions of the plurality of regions, wherein each IOT enabled operated aerial vehicle collects data during the event. Comparing the received data to the sound intensity map to determine the region where an audio component of a venue audio needs to be adjusted. Determining the adjustment required for the audio component and adjusting the audio equipment.

20 Claims, 7 Drawing Sheets

(51) Int. Cl.
    *H04R 1/08*     (2006.01)
    *H04R 29/00*     (2006.01)
    *G10L 25/57*     (2013.01)
    *B64D 47/00*     (2006.01)
    *G05D 1/10*     (2006.01)
    *G06V 20/10*     (2022.01)
    *G06V 20/40*     (2022.01)
    *G06V 40/10*     (2022.01)
    *G06V 40/20*     (2022.01)

(52) U.S. Cl.
    CPC .............. *G06V 20/40* (2022.01); *G06V 40/10* (2022.01); *G06V 40/28* (2022.01); *G10L 25/57* (2013.01); *G10L 25/60* (2013.01); *H04R 1/08* (2013.01); *H04R 29/001* (2013.01); *H04R 2430/01* (2013.01); *H04R 2499/13* (2013.01)

(56) References Cited

U.S. PATENT DOCUMENTS

| | | | |
|---|---|---|---|
| 10,009,687 | B2 | 6/2018 | Lee |
| 10,136,234 | B2 | 11/2018 | Di Censo |
| 10,351,240 | B1 | 7/2019 | Sills |
| 10,812,903 | B2 | 10/2020 | Wilson |
| 10,850,839 | B2 | 12/2020 | Xu |
| 2019/0349683 | A1 | 11/2019 | Anders |
| 2019/0384788 | A1 | 12/2019 | Pratt |

OTHER PUBLICATIONS

Mell, et al., "The NIST Definition of Cloud Computing", National Institute of Standards and Technology, Special Publication 800-145, Sep. 2011, 7 pages.

Shulman, "Sound and technology unlock innovation at MIT: Cross-disciplinary projects at MIT probe the technological and aesthetic limits of sound," MIT News on Campus and Around the World, Dec. 26, 2018 [accessed on Feb. 8, 2021], 5 pages, Massachusetts of Institute of Technology, Retrieved from the Internet: <URL: https://news.mit.edu/2018/sound-technology-unlock-innovation-at-mit-1226>.

US 11,593,061 B2

INTERNET OF THINGS ENABLE OPERATED AERIAL VEHICLE TO OPERATED SOUND INTENSITY DETECTOR

BACKGROUND

The present invention relates generally to the field of a venue's audio system, and more particularly to using internet of things (IOT) enabled operated aerial vehicle to help adjust the sound intensity of different regions in a venue.

Events can take place in different types of venues from a small venue to a large venue, from an enclosed venue to an open venue. Each type of venue offers different challenges for providing the best sound quality to an attendee of the event. Additionally, different types of events have different sound requirements. Furthermore, when the event is a presentation, different speakers could require different sound settings.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for updating an audio system of a venue during an event.

A method, the method comprising retrieving a sound intensity map for a venue, wherein the sound intensity map is divided up into a plurality of regions, wherein the sound intensity map predicts a sound quality for each region during a current event. Receiving data from a plurality of IOT enabled operated aerial vehicles, where each IOT enabled operated aerial vehicle of the plurality of IOT enabled operated aerial vehicles travels around different regions of the plurality of regions, wherein each IOT enabled operated aerial vehicle collects data during the event. Comparing the received data to the sound intensity map to determine the region where an audio component of a venue audio needs to be adjusted. Determining the adjustment required for the audio component and adjusting the audio equipment.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Figure 1:
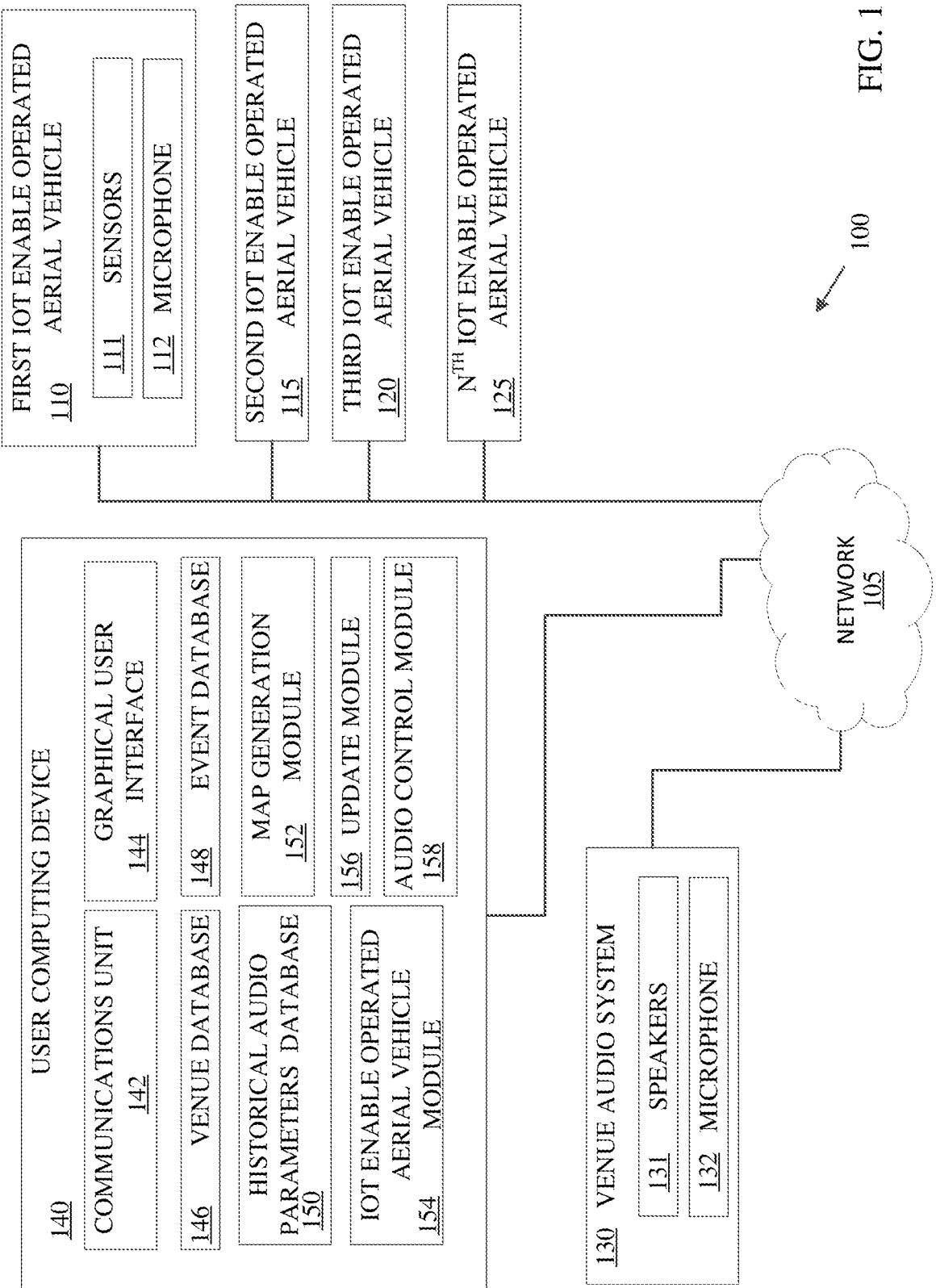
FIG. 1 is a functional block diagram illustrating a venue sound processing environment, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for controlling the audio system of a venue. Different venues have different acoustics and different events have different sound requirements. Furthermore, different speakers could have different sound requirements. The sound intensity at the venue prior to the event (e.g., sound checking) can be different sound intensity at the venue during the event (e.g., people in attendance). A sound intensity map is generated for the venue prior to the event taking place, where the map illustrates how the sound will behave in the venue. The sound intensity map is based on the data about the venue, data about the future event, and historical audio performance at the venue (e.g., historical audio operating parameters for past events). The map is divided into multiple regions, wherein an internet of things (IOT) enabled operated aerial vehicle is assigned to each region. The travel time between each region for each of the IOT enabled operated aerial vehicles is calculated. Each IOT enabled operated aerial vehicle is equipped with sensors to pick up video and audio data. Each IOT enabled operated aerial vehicle or some of the IOT enabled operated aerial vehicles can be further equipped with a microphone.

During the event, the IOT enabled operated aerial vehicles are traveling around their assigned region and are continuously collecting sound data and video data for their assigned region. Sound intensity (quality) during the event can differ from the predicted sound intensity for the event. Different factors can affect how the sound will perform during the event. For example, the number of attendees, how the attendees are distributed, weather, faulty equipment, speaker/entertainer performance, background noise (such as, people talking, outside construction, emergency services, etc.), or other factors that can affect the sound intensity during the event. The sound intensity map is updated based on the performance of the sound during the event. The audio system of the venue can be adjusted based on the updated sound intensity map. For example, the audio system of the venue can be adjusted by changing different operational parameters of components in the audio system, e.g., volume, power, pitch, noise cancelling, direction, etc. The venue audio system can be adjusted one or more times during the event based on the real-time performance of the sound and the continuously updated sound intensity map.

When attendee participation occurs at the event, e.g., attendees asking questions, the system can identify an attendee who wants to ask a question from the data collected from the IOT enabled operated aerial vehicles. For example, the video taken by the IOT enabled operated aerial vehicles can identify an attendee raising his hand, or the microphone on the IOT enabled operated aerial vehicle can pick up an attendee stating that he has a question. The system identifies the IOT enabled operated aerial vehicle (that has a microphone installed) with the shortest travel time to the identify attendee. The microphone on the IOT enabled operated aerial vehicle allows for the question to be ask and heard without the need for a microphone to be passed to the attendee or having the attendee move towards a microphone.

FIG. 1 is a functional block diagram illustrating a venue sound processing environment 100, in accordance with an embodiment of the present invention.

The venue sound processing environment 100 includes a plurality of internet of things (IOT) enabled operated aerial vehicles 110, 115, 120, 125, a venue audio system 130, and a user computing device 140. The different components can communicate with each other via the network 105.

Network 105 can be, for example, a local area network (LAN), a wide area network (WAN) such as the Internet, or a combination of the two, and can include wired, wireless, or fiber optic connections. In general, network 105 can be any combination of connections and protocols that will support communications between the plurality of IOT enabled operated aerial vehicles 110, 115, 120, 125, the venue audio system 130, and the user computing device 140.

The plurality of IOT enabled operated aerial vehicles 110, 115, 120, and 125 can be comprised of a first IOT enabled operated aerial vehicle 110, a second IOT enabled operated aerial vehicle 115, a third IOT enabled operated aerial vehicle 120, to a $N^{th}$ IOT enabled operated aerial vehicle 125. The number of IOT enabled operated aerial vehicles 110, 115, 120, and 125 described here and illustrated in the Figures is just an example. There can be only one IOT enabled operated aerial vehicle 110 used at the venue or a plurality of IOT enabled operated aerial vehicles 110, 115, 120, and 125 can be used at the venue. The size of the venue and the number of regions in the sound intensity map dictate the number of IOT enabled operated aerial vehicles 110, 115, 120, and 125 that are needed. The first IOT enabled operated aerial vehicle 110 is described herein, but the description can be applied to all the IOT enabled operated aerial vehicles 110, 115, 120, and 125. The first IOT enabled operated aerial vehicle 110 can include sensors 111 and a microphone 112. The sensors 111 can include audio sensors and video sensor. The first IOT enabled operated aerial vehicle 110 includes the microphone 112 to pick up questions/comments from an attendee. The microphone 112 can be included in all the IOT enabled operated aerial vehicles 110, 115, 120, and 125 or it can be included in a few of the IOT enabled operated aerial vehicles. The movement of the IOT enabled operated aerial vehicles 110, 115, 120, and 125 is controlled by user computing device 140 or separate controllers (not shown). The IOT enabled operated aerial vehicles 110, 115, 120, and 125 communicates with the user computing device 140 via the network 105.

The venue has a venue audio system 130 that includes different sound components, for example, speakers 131, microphones 132, and other sound components (not shown). The operating parameters for each of the components of the venue audio system 130 can be independently and remotely adjusted. The operating parameters of the components can be, for example, volume, power level, power consumption (on/off), pitch, tone, buffers, direction, etc. The components of the venue audio system 130 can be controlled by a central sound board (not shown), be independently controlled, or controlled by the user computing device 140. The venue audio system 130 communicates with the user computing device 140 to receive operating parameters for the components via the network 105.

Figure 6:
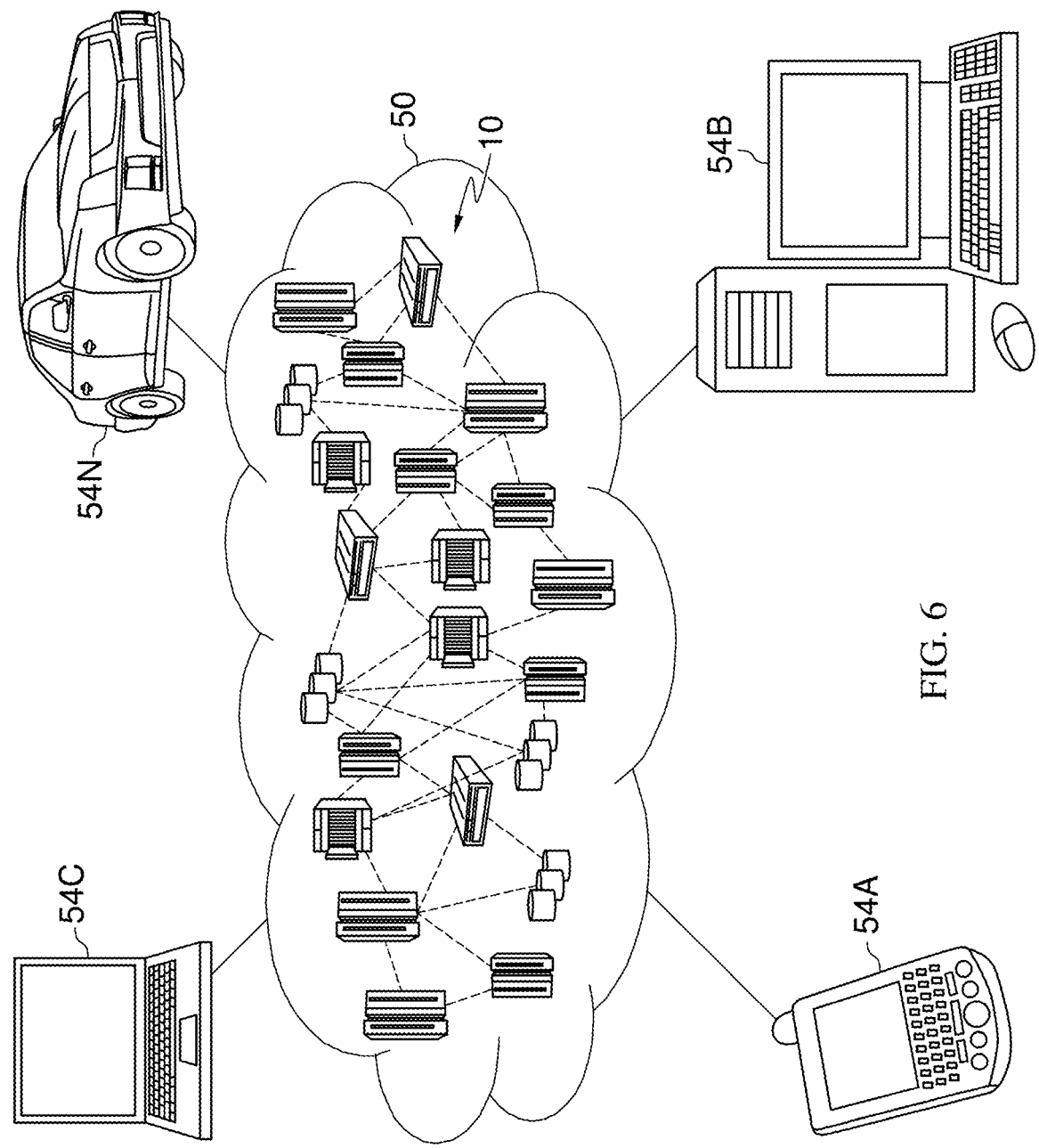
FIG. 6 depicts a cloud computing environment according to an embodiment of the present invention.
Figure 7:
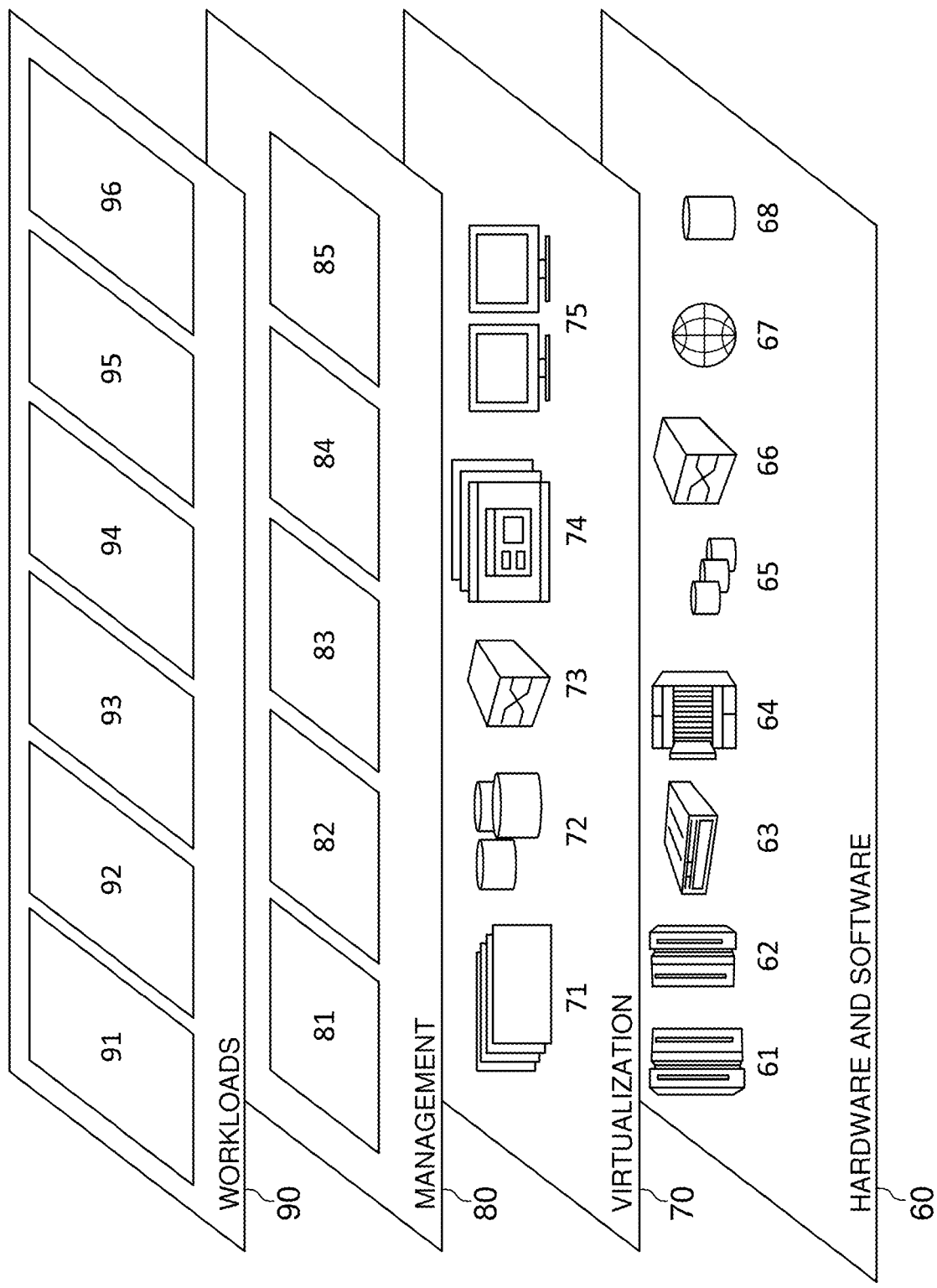
FIG. 7 depicts abstraction model layers according to an embodiment of the present invention.

The user computing device 140 includes a communications unit 142, a graphical user interface 144, a venue database 146, an event database 148, a historical audio parameters database 150, a map generation module 152, a IOT enabled operated aerial vehicle module 154, an update module 156, and an audio control module 158. User computing device 140 may be a laptop computer, tablet computer, netbook computer, personal computer (PC), a desktop computer, a personal digital assistant (PDA), a smart phone, or any programmable electronic device capable of communicating with the IOT enabled operated aerial vehicles 110, 115, 120, 125 and the venue audio system 130 via network 105. In other embodiments, user computing device 140 may include internal and external hardware components, as depicted, and described in further detail below with respect to FIG. 5, and operate in a cloud computing environment, as depicted in FIGS. 6 and 7.

The communications unit 142 allows for the user computing device 140 to send and receive data via the network 105. The graphical user interface 144 can be any type of display, keyboard, mouse, touch screen, or a combination thereof. The graphical user interface 144 allows for the user to view data and to input data. The venue database 146 is a data store that stores information about the venue. The venue database 146 stores information about the venue layout, topographical data, acoustic data, sound system layout (e.g., location of audio components), and any other data. The event database 148 is a datastore that stores information about different types of events. The event database 148 stores information about each type of event (e.g., presentations, panels, concerts, speakers, etc.), the sound requirements for each of the different type of events, profile information about the presenters/entertainer/speaker (since each person has a unique sound), typical crowd behavior at the event (e.g., make a lot of noise, sit and listen, sing along, etc.), or any other information about the event. The historical audio parameters database 150 is a datastore that stores information about the venue audio system 130 from prior events. The historical audio parameters database 150 stores information about operational parameters for each component of the venue audio system 130 during prior events conducted at the venue. For example, power settings, volume settings, feedback settings, pitch settings, direction, and any other audio settings for the venue audio system 130.

The map generation module 152 generates a sound intensity map for the venue. The sound intensity map is a map that predicts how the sound will perform during the event.

The map generation module 152 receives data about the venue from the venue database 146. For example, the map generation module 152 receives data about the venue size, open/closed venue, venue topography, audio placements, and any other information about the specific venue where the event will occur. The map generation module 152 receives data about the event from the event database 148. For example, the map generation module 152 receives data about the type of event, data about the speaker(s)/entertainer, data about audio requirements, data about the type of attendee, behavior of a typical attendee of the event, and any other data relating to the specific future event. The map generation module 152 receives data from the historical audio parameters database 150. For example, the map generation module 152 receives data about the audio operation parameters for the audio components from a past event, where the past event is the same type of the event that will occur in the future. The map generation module 152 generates a sound intensity map for the venue based on the data received from the venue database 146, the event database 148, and the historical audio parameters database 150. The sound intensity map predicts how the sound from the venue audio system 130 will perform during the future event. The map generation module 152 divides the sound intensity map into multiple regions. In the situation of a small venue, the sound intensity map could have one region. The map generation module 152 assigns a IOT enabled operated aerial vehicle 110, 115, 120, and 125 to each region, where the IOT enabled operated aerial vehicles 110, 115, 120, and 125 are assigned based on the capabilities of the IOT enabled operated aerial vehicles 110, 115, 120, and 125. For example, the IOT enabled operated aerial vehicle 110 that includes microphone 112 will be assigned to the region where attendees will be sitting down.

The IOT enabled operated aerial vehicle module 154 controls the movement of the IOT enabled operated aerial vehicles 110, 115, 120, and 125 during the event. Prior to the event, the IOT enabled operated aerial vehicle module 154 calculates the travel time between the regions for each of the IOT enabled operated aerial vehicles 110, 115, 120, and 125. The IOT enabled operated aerial vehicle module 154 controls the vertical movement, speed, and horizontal movement of each of the IOT enabled operated aerial vehicles 110, 115, 120, and 125. During the event, the IOT enabled operated aerial vehicles 110, 115, 120, and 125 collect sound and video data in their assigned region via the sensors 111. The sound data collected by the IOT enabled operated aerial vehicles 110, 115, 120, and 125 includes sounds from the venue audio system 130 and sounds from other sources. The other sources of sound can be, for example, the attendees, outside construction, traffic, emergency services, or other sources of noise. The collected sound data can differ within the region and can differ between regions. The IOT enabled operated aerial vehicle module 154 moves the IOT enabled operated aerial vehicles 110, 115, 120, 125 around their assigned region to allow data to be continuously collected at multiple locations within their assigned region. The IOT enabled operated aerial vehicles 110, 115, 120, and 125 may include sensors 111 that collect information about the weather conditions during the event. The weather conditions during the event, for example, humidity conditions, wind, dry air, etc., will affect how the sound performs during the event. All the data collected by the IOT enabled operated aerial vehicles 110, 115, 120, and 125 is transmitted back to the user computing device 140 via the network 105.

The update module 156 receives the sound data from the IOT enabled operated aerial vehicles 110, 115, 120, and 125. The update module 156 compares the received real-time sound data to the predicted sound data contained within the sound intensity map. The update module 156 identifies the region or regions where the sound is not acting as predicted for that region or regions. For example, the sound can be muffled because of outside noises, the sound could be louder because of the weather conditions, audio equipment can be malfunctioning, interference because of changes at the venue (structures, audio placement locations, etc.), or other factors affecting the sound during the event. There are many factors that can cause the sound not to behave as predicted. The update module 156 identifies the region where the current sound intensity is different than what is contain in the sound intensity map and determines how to adjust the audio components (for example, speakers 131) within the region. The purpose of the adjustments can be to change the real time sound conditions to match the predicted sound conditions or the adjustments can be to both the audio equipment and the sound intensity map (e.g., attendees are not congregating in the predicted region, thus the sound volume can be reduced in that region). The update module 156 sends audio adjustments to the audio control module 158 and updates the sound intensity map to reflect the updated audio information. The audio adjustments are changes to the operating parameters for the audio equipment of the venue audio system 130. The audio adjustments can be for example, volume, pitch, power level, on/off, rotate the speaker 131 to adjust direction, buffers, or other operational parameters.

The update module 156 does not rely just on the sound data from the IOT enabled operated aerial vehicles 110, 115, 120, and 125. The update module 156 receives video data from the IOT enabled operated aerial vehicles 110, 115, 120, and 125. The received video data illustrates the attendees, the topography, buildings, obstructions, or other sound hinderances contained within the region. The video is analyzed to identify where the attendees are located. For example, the attendees could be gathering in a region that was not predicted to have a high attendance population or the attendance population could be lower than predicted in some regions. The update module 156 determines that the sound intensity in the regions needs to be adjusted based on the attendance population distribution within the regions. The update module 156 can adjust the sound intensity based on any obstructions, topographical changes, or other physical changes that differ than those used to create the sound intensity map. The update module 156 sends audio adjustments to the audio control module 158 and updates the sound intensity map to reflect the updated audio information.

The video data from the IOT enabled operated aerial vehicles 110, 115, 120, and 125 can be analyzed to recognize certain attendees. For example, when the event is a speaker/presentation/question and answer or something similar, an attendee might like to ask a question. A microphone can be passed around the attendees and the attendee who wants to ask a question can hope that the microphone is passed to him so that he can ask his question. Furthermore, the time required to pass around the microphone from attendee to attendee can be excessive. An alternative solution is to utilize stationary microphones that require the attendee to move to the microphone. The problem with this solution is that attendees moving around trying to reach the microphone can be disruptive towards other attendees. The solution is to analyze the sound data and video data from the IOT enabled operated aerial vehicles 110, 115, 120, and 125 to identify an attendee who wants to ask a question. For example, analyzing the video data can identify an attendee who wants to ask a question when the attendee stands up and remains stationary, or when the attendee raises their hand. Once the attendee has been identified than the update module 152 sends the location of the attendee to the IOT enabled operated aerial vehicle module 154. Furthermore, the update module 156 can adjust the sound intensity in the region where the identified attendee is located since the attendees in that region appear to be attentive towards the speaker/presenter.

When the IOT enabled operated aerial vehicle module 154 is notified of a location of the attendee who wants to ask a question, then the IOT enabled operated aerial vehicle module 154 identifies the IOT enabled operated aerial vehicle 110 that has a microphone 112 out of the IOT enabled operated aerial vehicles 110, 115, 120, and 125 that has the shortest travel time to the location of the identified attendee. Once the IOT enabled operated aerial vehicle 110 has been identified then the IOT enabled operated aerial vehicle module 154 moves the IOT enabled operated aerial vehicle 110 to the identified attendee to pick up the audio question from the attendee.

The audio control module 158 receives the audio adjustments from the update module 156 and the audio control module 158 communicates the audio adjustments to the venue audio system 130. The audio control module 158 can directly control audio components, for example, speakers 131 or microphone 132, to change the different operating parameters for the corresponding audio equipment. Alternatively, the audio control module 158 can send adjustments to the venue audio system 130, wherein the venue audio system 130 adjust the operating parameters for the audio equipment. Then the venue audio system 130 adjust the operating parameters for the audio equipment.

Figure 2:
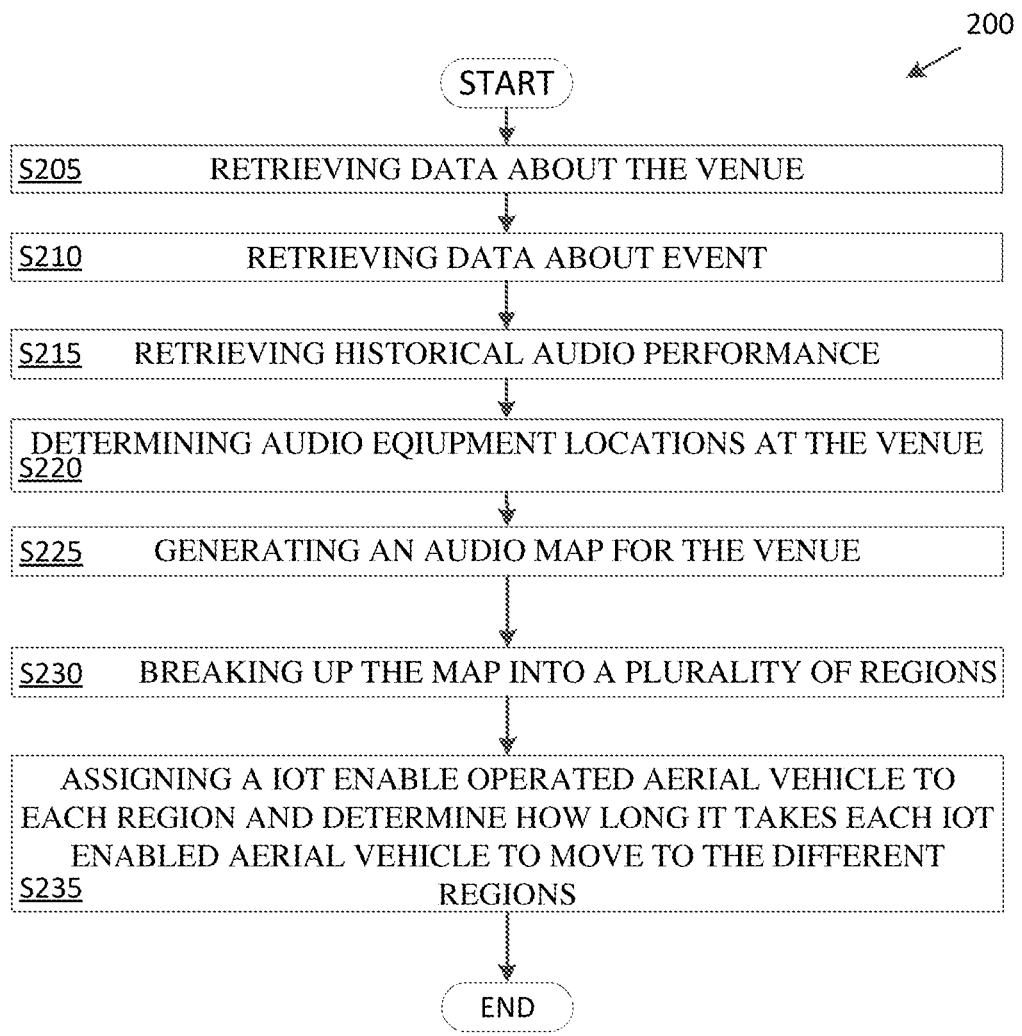
FIG. 2 is a flowchart depicting operational steps of generating an initial sound intensity map in the venue sound processing environment of FIG. 1, in accordance with an embodiment of the present invention.

FIG. 2 is a flowchart depicting operational steps 200 of generating an initial sound intensity map in the venue sound processing environment of FIG. 1, in accordance with an embodiment of the present invention.

Prior to an event occurring at a venue, the user computing device 140 retrieves data about the venue from the venue database 146 (S205). The retrieved venue data includes data about the audio system (components, location of components), topography, etc. The user computing device 110 retrieves data about the event from the event database 148 (S210). The retrieved event data includes the type of event, information about speaker/entertainer, type of attendee, audio requirements, etc. The user computing device 110 retrieves data from the historical audio parameters database 150 (S215). The retrieved historical parameters data includes audio parameter settings for the audio equipment from prior events of the same type of event that will occur in the future. The map generation module 152 determines a location in the venue for each piece of audio equipment of the venue audio system 130 from the retrieved venue data (S220). The map generation module 152 generates a sound intensity map for the venue based on the retrieved data (S225). The map generation module 152 divides the sound intensity map into a plurality of regions (S230). The sound intensity map shows a prediction how the sound should behave in each region at the upcoming event. Depending on the size of the venue, the map generation module 152 can determine that only one region is necessary. The map generation module 152 assigns a IOT enabled operated aerial vehicle 110, 115, 120, or 125 to each region based on the requirements for the region (S235). For example, a IOT enabled operated aerial vehicle 110 with a microphone 112 will be assigned to a region where attendees will probably be located based on the sound intensity map (S235). The IOT enabled operated aerial vehicle module 154 calculates a time it will take each IOT enabled operated aerial vehicle 110, 115, 120, and 125 to fly around their assigned region and calculates a time it takes each IOT enabled operated aerial vehicle 110, 115, 120, and 125 travel from their assigned region to each separate region (S235).

Figure 3:
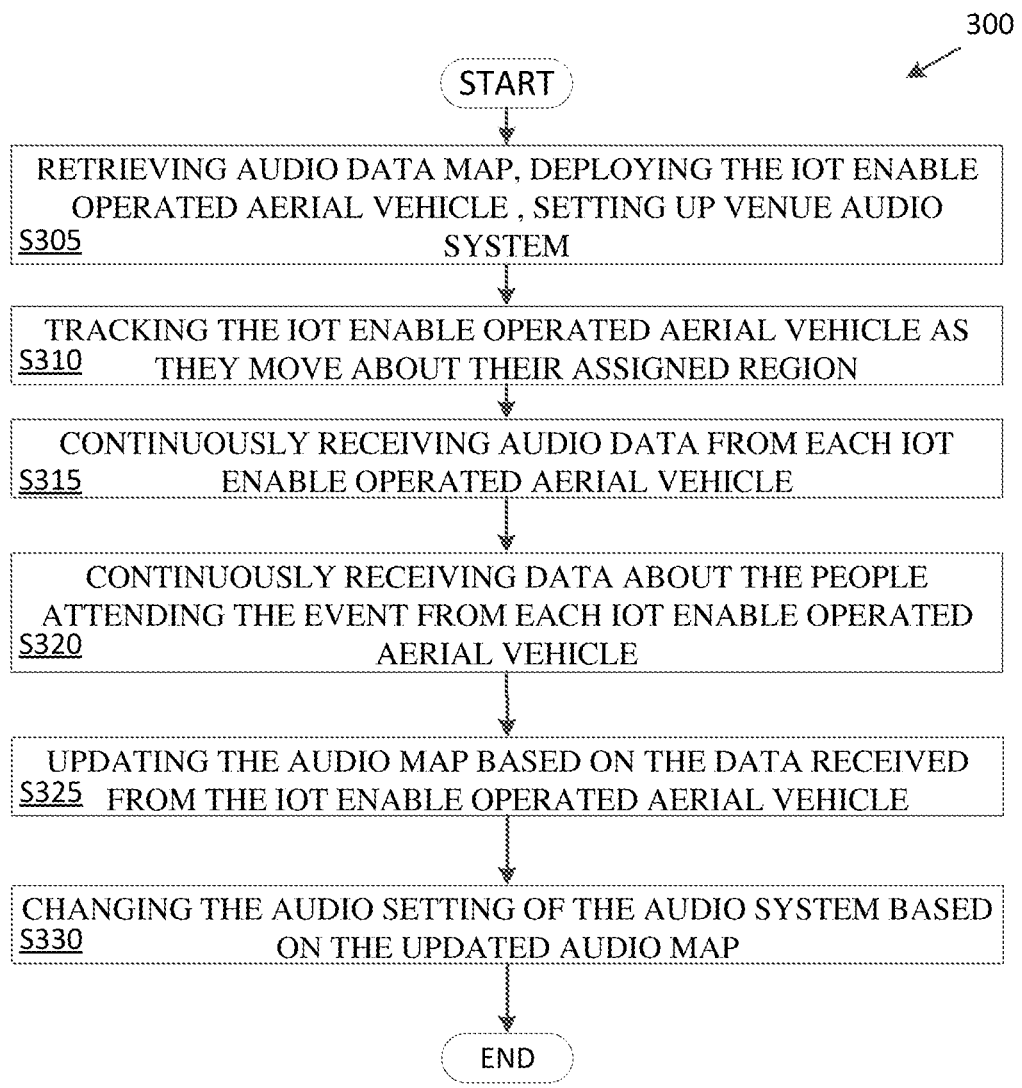
FIG. 3 is a flowchart depicting operation steps of updating the sound map and the sound system of the venue during an event, in accordance with an embodiment of the present invention.

FIG. 3 is a flowchart depicting operation steps 300 of updating the sound map and the sound system of the venue during an event, in accordance with an embodiment of the present invention.

The update module 156 retrieves the sound intensity map and the IOT enabled operated aerial vehicle module 154 deploys the IOT enabled operated aerial vehicles 110, 115, 120, and 125 to their assigned region (S305). The audio control module 158 sets the components venue audio system 130 to the predetermined operational parameters as described in the sound intensity map (S305). The IOT enabled operated aerial vehicle module 154 tracks the IOT enabled operated aerial vehicles 110, 115, 120, and 125 as they travel around their assigned region (S310). The sound data and video data are collected by the sensors 111 on IOT enabled operated aerial vehicles 110, 115, 120, and 125 as they travel around their assigned regions (S315). The sound data and the video data are continuously collected during the event from each IOT enabled operated aerial vehicle 110, 115, 120, and 125 (S315). The update module 156 continuously receives the sound data and the video data from each IOT enabled operated aerial vehicle 110, 115, 120, and 125 (S315). Furthermore, the update module 156 could receive other data, for example, weather data, from the IOT enabled operated aerial vehicles 110, 115, 120, and 125. The update module 156 determines the difference between the sound predictions and the real-time sound data by comparing the received data to the data contained in the sound intensity map (S325). The update module 156 further determines if the video data contains any differences in the conditions in the regions during the event from what was predicted (S325). For example, the population distribution of attendees in each region can be different than was predicted. The update module 156 determines how the operating parameters of components in the venue audio system 130 should be adjusted based on the received data, the sound intensity map, and the determined differences (S325). The update module 156 updates the sound intensity map to reflect the current sound conditions (S325). The audio control module 158 communicates with the audio components of the venue audio system 130, for example, speakers 131 and changes the operating parameters of the audio component (S330).

Figure 4:
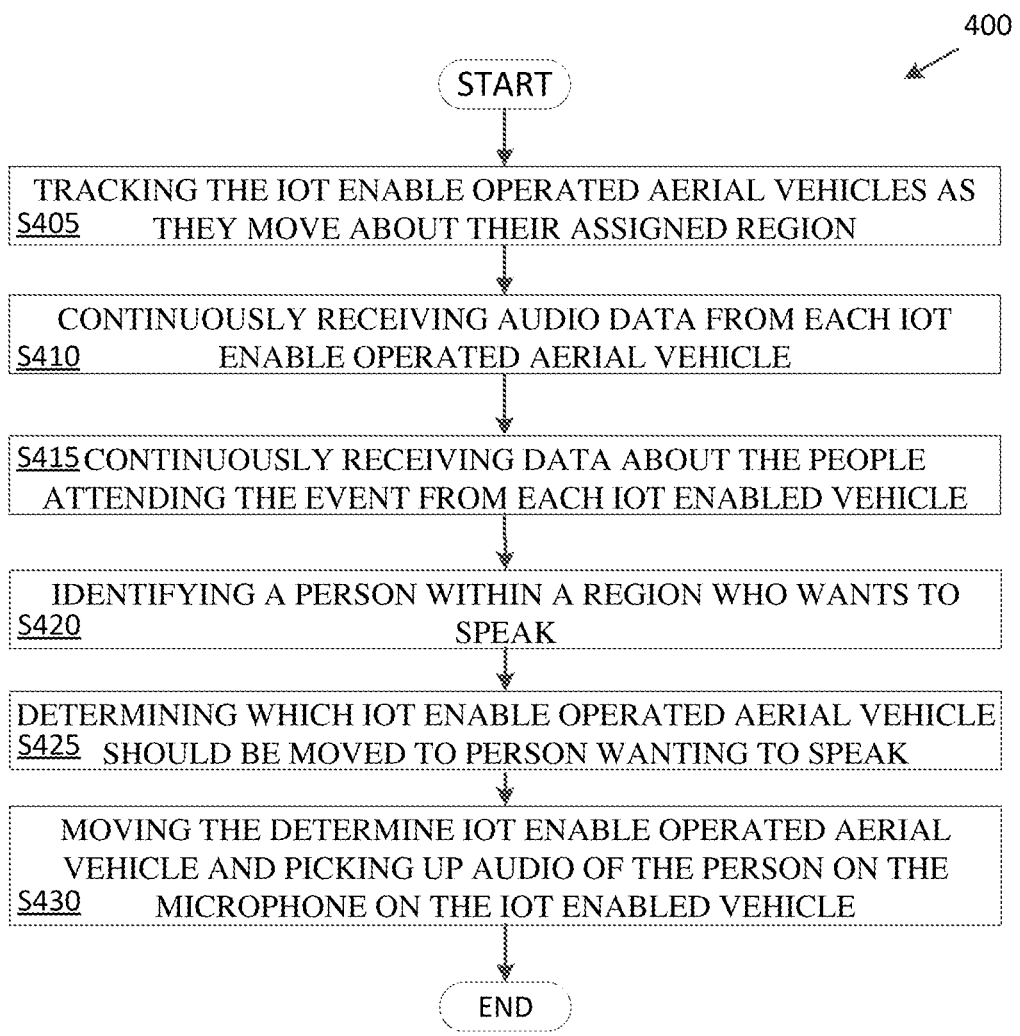
FIG. 4 is a flowchart depicting operation steps of controlling internet of things (IOT) enabled operated aerial vehicle to direct them to attendees who want to speak, in accordance with an embodiment of the present invention.

FIG. 4 is a flowchart depicting operation steps 400 of controlling IOT enabled operated aerial vehicles to direct them to attendees who want to speak, in accordance with an embodiment of the present invention.

The update module 156 retrieves the sound intensity map and the IOT enabled operated aerial vehicle module 154 deploys the IOT enabled operated aerial vehicles 110, 115, 120, and 125 to their assigned region. The audio control module 158 sets the components venue audio system 130 to the predetermined operational parameters as described in the sound intensity map. The IOT enabled operated aerial vehicle module 154 tracks the IOT enabled operated aerial vehicles 110, 115, 120, and 125 as they travel around their assigned region (S405). The sound data and video data are collected by the sensors 111 on IOT enabled operated aerial vehicles 110, 115, 120, and 125 as they travel around their assigned regions (S405). The sound data and the video data are continuously collected during the event from each IOT enabled operated aerial vehicle 110, 115, 120, and 125 (S410). The video data is continuously collected during the event from each IOT enabled operated aerial vehicle 110, 115, 120 and 125 (S420). The update module 156 analyzes the sound data from the regions where the attendees are congregating to identify attendees who want to ask a question (S420). The update module 156 analyzes the video data to identify attendees who want to speak, for example, the video data can contain images of an attendee who raises his hand or stands up and stays in place (S420). The update module 156 analyzes the sound data to see if an attendee spoke up stating he has a question (S420). The update module 156 identifies the location of the attendee who wants to speak (S420). The IOT enabled operated aerial vehicle module 154 determines which IOT enabled operated aerial vehicle 110 that has the proper capabilities (e.g., a microphone 112) that has the shortest travel time to the identified attendee (S425). The IOT enabled operated aerial vehicle module 154 instructs the IOT enabled operated aerial vehicle 110 to travel to the location of the attendee (S430). The IOT enabled operated aerial vehicle 110 travels to the location of the identified attendee (S430).

Figure 5:
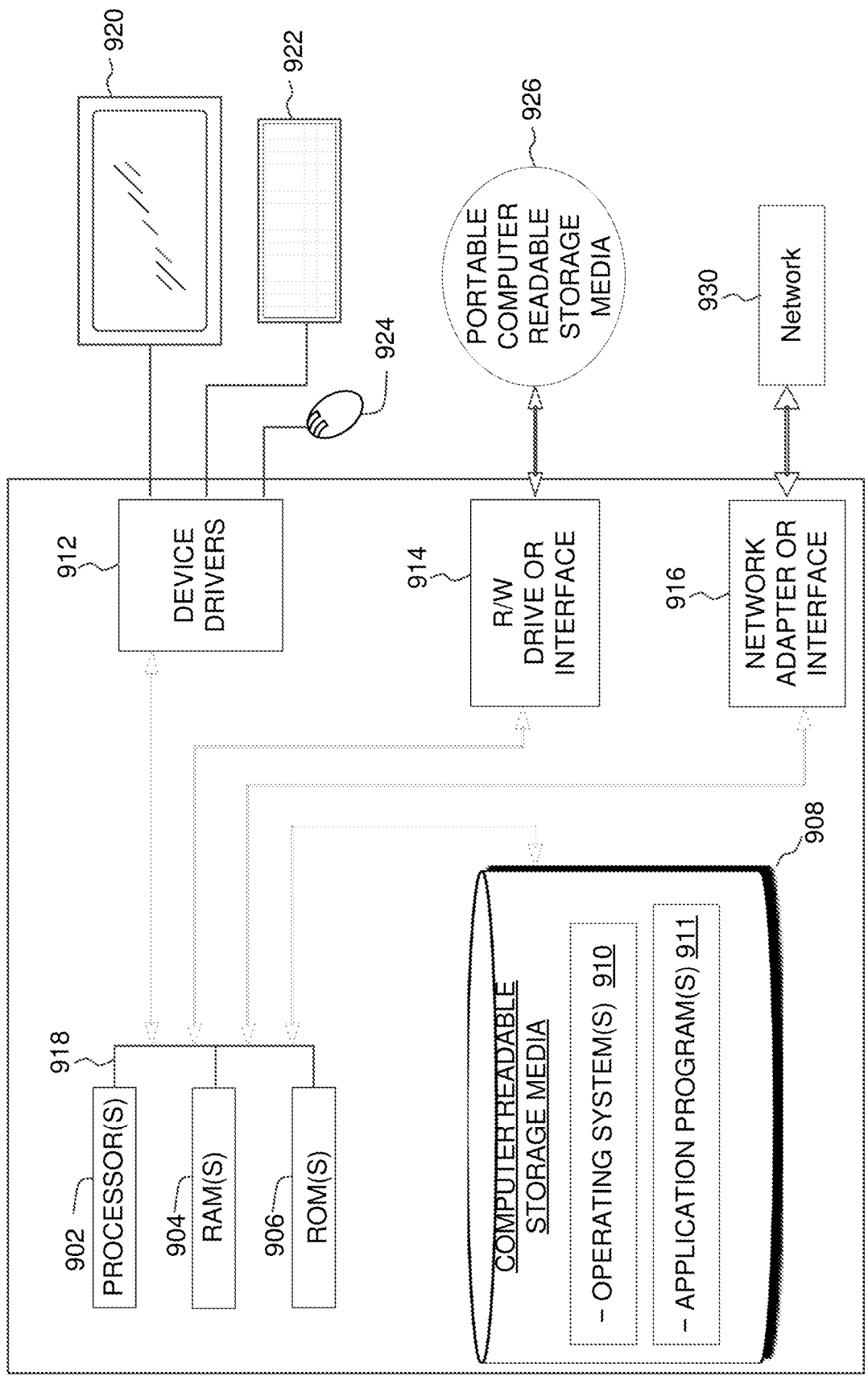
FIG. 5 is a block diagram of components of a computing device of the venue sound processing environment of FIG. 1, in accordance with embodiments of the present invention.

FIG. 5 depicts a block diagram of components of user computing device 140 of the venue sound processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

User computing device 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications, and network processors, etc.), system memory, peripheral devices, and any other hardware components within a system.

One or more operating systems 910, and one or more application programs 911, for example, map generation module 152 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 140 may also include a R/W drive or interface 914 to read from and write to one or more portable computer readable storage media 926. Application programs 911 on user computing device 140 may be stored on one or more of the portable computer readable storage media 926, read via the respective R/W drive or interface 914 and loaded into the respective computer readable storage media 908.

User computing device 140 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on user computing device 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing device 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and map generation module 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method, the method comprising:
retrieving, by a computer, a sound intensity map for a venue, wherein the sound intensity map is divided up into a plurality of regions, wherein the sound intensity map predicts a sound quality for each region during a current event;
receiving, by the computer, data from a plurality of interact of things (IOT) enabled operated aerial vehicles, where each IOT enabled operated aerial vehicle of the plurality of IOT enabled operated aerial vehicles travels around different regions of the plurality of regions, wherein each IOT enabled operated aerial vehicle collects data during the event;
comparing, by the computer, the received data to the sound intensity map to determine the region where an audio component of a venue audio needs to be adjusted;
determining, by the computer, the adjustment required for the audio component; and
adjusting, by the computer, the audio equipment.

2. The method of claim 1, wherein the adjustment for the audio equipment is comprised of changing at least one operational parameter of the audio equipment.

3. The method of claim 1, wherein the changing at least one operation parameter of the audio equipment is selected from a group consisting of power level, volume, pitch, buffer, direction, or another operating parameter.

4. The method of claim 1, wherein the received data from the plurality of IOT enabled operated aerial vehicles is comprised of sound data and video data.

5. The method of claim 4, further comprising:
analyzing, by the computer, the sound data from each IOT enabled operated aerial vehicle to determine the current sound condition for each region; and
wherein the comparing the received data to the sound intensity map comprises comparing the received sound data from a IOT enabled operated aerial vehicle in each of the plurality of regions to the predicted sound quality in each region contained within the sound intensity map.

6. The method of claim 4, further comprising:
analyzing, by the computer, the sound data from each IOT enabled operated aerial vehicle to identify an attendee who would like to ask a question;
determining, by the computer, the location of the attendee who wants to ask a question; and
moving, by the computer, a IOT enabled operated aerial vehicle of the plurality of IOT enabled operated aerial vehicles to the location of the attendee, wherein the IOT enabled operated aerial vehicle includes a microphone.

7. The method of claim 4, further comprising:
analyzing, by the computer, the video data from each IOT enabled operated aerial vehicle to identify an attendee who would like to ask a question;
determining, by the computer, the location of the attendee who wants to ask a question; and
moving, by the computer, a IOT enabled operated aerial vehicle of the plurality of IOT enabled operated aerial vehicles to the location of the attendee, wherein the IOT enabled operated aerial vehicle includes a microphone.

8. The method of claim 7, wherein analyzing the video data from each IOT enabled operated aerial vehicle to identify the attendee who would like to ask a question comprises analyzing the video to determine if the attendee raises their hand or if the attendee stands up and stands still.

9. A computer program product, the computer program product comprising:
one or more non-transitory computer-readable storage media and program instructions stored on the one or more non-transitory computer-readable storage media, the program instructions comprising:
program instructions to retrieve a sound intensity map for a venue; wherein the sound intensity map is divided up into a plurality of regions, wherein the sound intensity map predicts a sound quality for each region during a current event;
program instructions to receive data from a plurality of Internet of things (IOT) enabled operated aerial vehicles, where each IOT enabled operated aerial vehicle of the plurality of IOT enabled operated aerial vehicles travels around different regions of the plurality of regions, wherein each IOT enabled operated aerial vehicle collects data during the event;
program instructions to compare the received data to the sound intensity map to determine the region where an audio component of a venue audio needs to be adjusted;
program instructions to determine the adjustment required for the audio component; and
program instructions to adjust the audio equipment.

10. The computer program product of claim 9, wherein the adjustment for the audio equipment is comprised of changing at least one operational parameter of the audio equipment.

11. The computer program product of claim 9, wherein the changing at least one operation parameter of the audio equipment is selected from a group consisting of power level, volume, pitch, buffer, direction, or another operating parameter.

12. The computer program product of claim 9, wherein the received data from the plurality of IOT enabled operated aerial vehicles is comprised of sound data and video data.

13. The computer program product of claim 12, further comprising:
program instructions to analyze the sound data from each IOT enabled operated aerial vehicle to determine the current sound condition for each region; and
wherein the comparing the received data to the sound intensity map comprises comparing the received sound data from a IOT enabled operated aerial vehicle in each of the plurality of regions to the predicted sound quality in each region contained within the sound intensity map.

14. The computer program product of claim 12, further comprising:
  program instructions to analyze the sound data from each IOT enabled operated aerial vehicle to identify an attendee who would like to ask a question;
  program instructions to determine the location of the attendee who wants to ask a question; and
  program instructions to move a IOT enabled operated aerial vehicle of the plurality of IOT enabled operated aerial vehicles to the location of the attendee, wherein the IOT enabled operated aerial vehicle includes a microphone.

15. The computer program product of claim 12, further comprising:
  program instructions to analyze the video data from each IOT enabled operated aerial vehicle to identify an attendee who would like to ask a question;
  program instructions to determine the location of the attendee who wants to ask a question; and
  program instructions to move a IOT enabled operated aerial vehicle of the plurality of IOT enabled operated aerial vehicles to the location of the attendee, wherein the IOT enabled operated aerial vehicle includes a microphone.

16. The computer program product of claim 15, wherein analyzing the video data from each IOT enabled operated aerial vehicle to identify the attendee who would like to ask a question comprises analyzing the video to determine if the attendee raises their hand or if the attendee stands up and stands still.

17. A computer system, the computer system comprising:
  one or more computer processors, one or more computer-readable storage media, and program instructions stored on the one or more of the computer-readable storage media for execution by at least one of the one or more processors, the program instructions comprising:
    program instructions to retrieve a sound intensity map for a venue; wherein the sound intensity map is divided up into a plurality of regions, wherein the sound intensity reap predicts a sound quality for each region during a current event;
    program instructions to receive data from a plurality of IOT enabled operated aerial vehicles, where each IOT enabled operated aerial vehicle of the plurality of IOT enabled operated aerial vehicles travels around different regions of the plurality of regions, wherein each IOT enabled operated aerial vehicle collects data during the event,
    program instructions to compare the received data to the sound intensity map to determine the region where an audio component of a venue audio needs to be adjusted;
    program instructions to determine the adjustment required for the audio component; and
    program instructions to adjust the audio equipment.

18. The computer system of claim 17, wherein the received data from the plurality of IOT enabled operated aerial vehicles is comprised of sound data and video data.

19. The computer system of claim 18, further comprising:
  program instructions to analyze the sound data from each IOT enabled operated aerial vehicle to identify an attendee who would like to ask a question;
  program instructions to determine the location of the attendee who wants to ask a question; and
  program instructions to move a IOT enabled operated aerial vehicle of the plurality of IOT enabled operated aerial vehicles to the location of the attendee, wherein the IOT enabled operated aerial vehicle includes a microphone.

20. The computer system of claim 19, further comprising:
  program instructions to analyze the video data from each IOT enabled operated aerial vehicle to identify an attendee who would like to ask a question;
  program instructions to determine the location of the attendee who wants to ask a question; and
  program instructions to move a IOT enabled operated aerial vehicle of the plurality of IOT enabled operated aerial vehicles to the location of the attendee, wherein the IOT enabled operated aerial vehicle includes a microphone.

* * * * *